(12) United States Patent
Katariya et al.

(10) Patent No.: US 6,549,897 B1
(45) Date of Patent: Apr. 15, 2003

(54) METHOD AND SYSTEM FOR CALCULATING PHRASE-DOCUMENT IMPORTANCE

(75) Inventors: Sanjeev Katariya, Issaquah, WA (US); William P. Jones, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/215,513

(22) Filed: Dec. 17, 1998

Related U.S. Application Data

(60) Provisional application No. 60/103,614, filed on Oct. 9, 1998.

(51) Int. Cl.[7] .......................... G06F 17/30; G06F 15/00
(52) U.S. Cl. ................. 707/5; 707/3; 707/6; 715/500.1
(58) Field of Search ............................... 707/500, 3, 5, 707/6

(56) References Cited

U.S. PATENT DOCUMENTS

| | | | | |
|---|---|---|---|---|
| 5,488,725 A | * | 1/1996 | Turtle et al. ................... | 707/5 |
| 5,694,592 A | * | 12/1997 | Driscoll ......................... | 704/9 |
| 5,819,260 A | * | 10/1998 | Lu et al. ........................ | 707/1 |
| 6,334,132 B1 | * | 12/2001 | Weeks ........................ | 707/100 |
| 6,353,827 B1 | * | 3/2002 | Davies et al. .................. | 707/6 |

OTHER PUBLICATIONS

Hogg, Robert V. and Elliot A. Tanis, Probability and Statistical Inference, 3rd Edition, 1983.*

* cited by examiner

Primary Examiner—Joseph H. Feild
Assistant Examiner—Rachna Singh
(74) Attorney, Agent, or Firm—Woodcock Washburn LLP

(57) ABSTRACT

A method and system for generating a weight for phrases within each document in a collection of documents. Each document has terms such as words and numbers. Each phrase comprises component terms. Each term frequency represents the number of occurrences of a term in a document, and the phrase frequency represents the number of occurrences of a phrase in a document. To generate the weight, the weighting system first estimates a document frequency for the phrase by multiplying an estimated phrase probability of the phrase times the number of documents that contain each component term. The estimated phrase probability is an estimation of the probability that any phrase in documents that contain each component term is the phrase whose weight is to be estimated. The document frequency is the number of the documents that contain the phrase. The weighting system then estimates a total phrase frequency for the phrase as the average phrase frequency for the phrase times the estimated document frequency for the phrase. The weighting system derives the average phrase frequency from the phrase probability of the phrase and average number of terms per document. The weighting system then combines the estimated document frequency with the estimated total phrase frequency to generate the weight of the phrase.

66 Claims, 4 Drawing Sheets

METHOD AND SYSTEM FOR CALCULATING PHRASE-DOCUMENT IMPORTANCE

CROSS-REFERENCE TO RELATED APPLICATION

This application claims the benefit of U.S. Provisional Application No. 60/103,614, filed Oct. 9, 1998, which application is incorporated by reference in its entirety.

TECHNICAL FIELD

This invention relates generally to a computer system for searching for documents, and more specifically to calculating the phrase-document importance of phrases within a collection of documents.

BACKGROUND OF THE INVENTION

The Internet is a collection of interconnected computer systems through which users can access a vast store of information. The information accessible through the Internet is stored in electronic files (i.e., documents) under control of the interconnected computer systems. It has been estimated that over 50 million documents are currently accessible through the Internet and that the number of documents is growing at the rate of 75% per year. Although a wealth of information is stored in these documents, it has been very difficult for users to locate documents relating to a subject of interest. The difficulty arises because documents are stored in many different computer systems, and the Internet provides no central mechanism for registering documents. Thus, a user may not even know of the existence of certain documents, let alone the subject matter of the documents. Each document that is accessible through the Internet is assigned a unique identifier, which is referred to as a uniform resource locator ("URL"). Once a user knows the identifier of a document, the user can access the document. However, even if a user knows the identifiers of all documents accessible through the Internet, the user may not know the subject matter of the document. Thus, the user may have no practical way to locate a document relating to a subject of interest.

Several search engines have been developed to assist users to locate documents relating to a subject of interest. Search engines attempt to locate and index as many of the documents provided by as many computer systems of the Internet as possible. The search engines index the documents by mapping terms that represent the subject matter of each document to the identifier of the document. For example, if a search engine determines that the terms "united" and "states" represent the subject matter of a document, then the search engine would map each of those terms to the URL for the document. When using a search engine to locate documents relating to a subject of interest, the user enters search terms that describe the subject of interest. The search engine then searches the index to identify those documents that are most relevant to the search terms. For example, if a user enters the search terms "united" and "states," then the search engine searches the index to identify the documents that are most relevant to those search terms. In addition, the search engine may present the search results, that is the list of relevant documents, to the user in order based on the relevance to the search term. The user can then select and display the most relevant documents.

The accuracy of the search results depends upon the accuracy of the indexing used by a search engine. Unfortunately, there is no easy way for a search engine to determine accurately the subject matter of documents. The difficulty in determining the subject matter of a document is compounded by the wide variety of formats (e.g., as a word processing documents or as a hyper-text document) and the complexity of the formats of the documents accessible through the Internet. To make it easier for a search engine to determine the subject matter of a document, some document formats have a "keyword" section that provides words that are representative of the subject matter of the document. Unfortunately, creators of documents often fill the "keyword" section with words that do not accurately represent the subject matter of the document using what is referred to as "false promoting" or "spamming." For example, a creator of a classified advertising web page for automobiles that may fill the "keyword" section with repetitions of the word "car." The creator does this so that a search engine will identify that web page as very relevant whenever a user searches for the term "car." However, a "keyword" section that more accurately represents the subject matter of the web page may include the words "automobile," "car," "classified," "for," and "sale."

Because the document formats have no reliable way to identify the subject matter of a document, search engines use various algorithms to determine the actual subject matter of documents. Such algorithms may generate a numerical value for each term in a document that rates importance of the term within the document. For example, if the term "car" occurs in a document more times than any other term, then the algorithm may give a high numerical value to the term "car" for that document. Typical algorithms used to rate the importance of a term within a document often factor in not only the frequency of the occurrence of term within the document, but also the number of documents that contain that term. For example, if a term occurs two times in a certain document and also occurs in many other documents, then the importance of that term to the document may be relatively low. However, if the term occurs two times in that document, but occurs in no other documents, then the importance of that term within the document may be relatively high even though the term occurs only two times in the document. In general, these algorithms attempt to provide a high "information score" to the terms that best represent the subject matter of a document with respect to both the document itself and to the collection of documents.

To calculate the importance or "information score," typical algorithms take into consideration what is referred to as the term frequency within a document and the document frequency. The term frequency of a term is the number of times that the term occurs in the document. The term frequency for term i within document j is represented as $TF_{ij}$. The document frequency of a term is the number of documents in which the term occurs. The document frequency for term i is represented as $n_i$. One such algorithm uses the Salton Buckley formula for calculating the importance of terms. The formula is given by the following equation:

$$W_{ij} = \log_2 TF_{ij} * \log_2 \frac{N}{n_i} \tag{1}$$

where $W_{ij}$ is the numerical value (i.e., weight) of the importance of the term i to the document j, where $TF_{ij}$ is the term frequency, where $n_i$ is the document frequency, and where N is the total number of documents in a collection of documents. The quotient $N/n_i$ is referred to as the inverse document frequency, which is the inverse of the ratio of the number of documents that contain the term to the total number of documents. As the term frequency increases, the weight calculated by this formula increases logarithmically. That is, as the term occurs more frequently in a document, the weight of that term within the document increases. Also, as the document frequency increases, the weight decreases logarithmically. That is, as a term occurs in more documents, the weight of the term decreases. It is, of course, desirable to use a formula that results in weights that most accurately reflect the importance or information score of terms.

Search engines typically identify and index only single terms. Search engines, however, do not typically index phrases, which are sequences of two or more terms. For example, a search engine may index the terms that comprise the phrase "United States," separately. Thus, when a user wants to locate documents related to the "United States," the search engine may locate many documents that contain the terms "united" and states," but that do not contain the phrase "United States." As a result, the search engine may locate many documents that are of no interest to the user. For example, the search engine may locate documents that contain the sentence: "He then states that united we stand." Moreover, even if a search engine could index phrases, the search engines would calculate the importance of a phrase in a manner that is analogous the calculation of the importance of a term. That is, the search engines would treat the phrase as a single term and would use the formula as shown in equation (1) to calculate the weight of the phrase. However, such treatment of phrases is impractical for large collections of documents with a large number of unique terms. In particular, since the number of possible phrases increases exponentially with the length of the phrase, the number of frequencies that would need to be determined and stored for each document would also increase exponentially. Thus, it would be desirable to have a technique to calculate the importance of a phrase in a way that avoids this increase in storing.

SUMMARY OF THE INVENTION

An embodiment of the present invention provides a method and system for generating a weight for phrases within each document in a collection of documents. Each document has terms such as words and numbers. Each phrase comprises component terms. A phrase may be a complete sentence or a sentence minus certain words (e.g., "a" or "the"). The weighting system uses the term frequencies of the component terms to calculate the weight of a phrase, rather than counting the actual phrase frequencies of phrases in each document in the collection. Each term frequency represents the number of occurrences of a term in a document, and the phrase frequency represents the number of occurrences of a phrase in a document. To generate the weight, the weighting system first estimates a document frequency for the phrase by multiplying an estimated phrase probability by the number of documents that contain each component term. The estimated phrase probability is an estimation of the probability that any phrase in documents that contain each component term is the phrase whose weight is to be estimated. The weighting system derives the phrase probability from the term probabilities of the component terms. The term probability of a component term is the ratio of the average term frequency in the documents in which that component term occurs to the average number of terms within a document. The document frequency is the number of the documents that contain the phrase. The weighting system then estimates a total phrase frequency for the phrase as the average phrase frequency for the phrase times the estimated document frequency for the phrase. The weighting system derives the average phrase frequency from the phrase probability of the phrase and average number of terms per document. The weighting system then combines the estimated document frequency with the estimated total phrase frequency to generate the weight of the phrase.

DETAILED DESCRIPTION OF THE INVENTION

Figure 1:
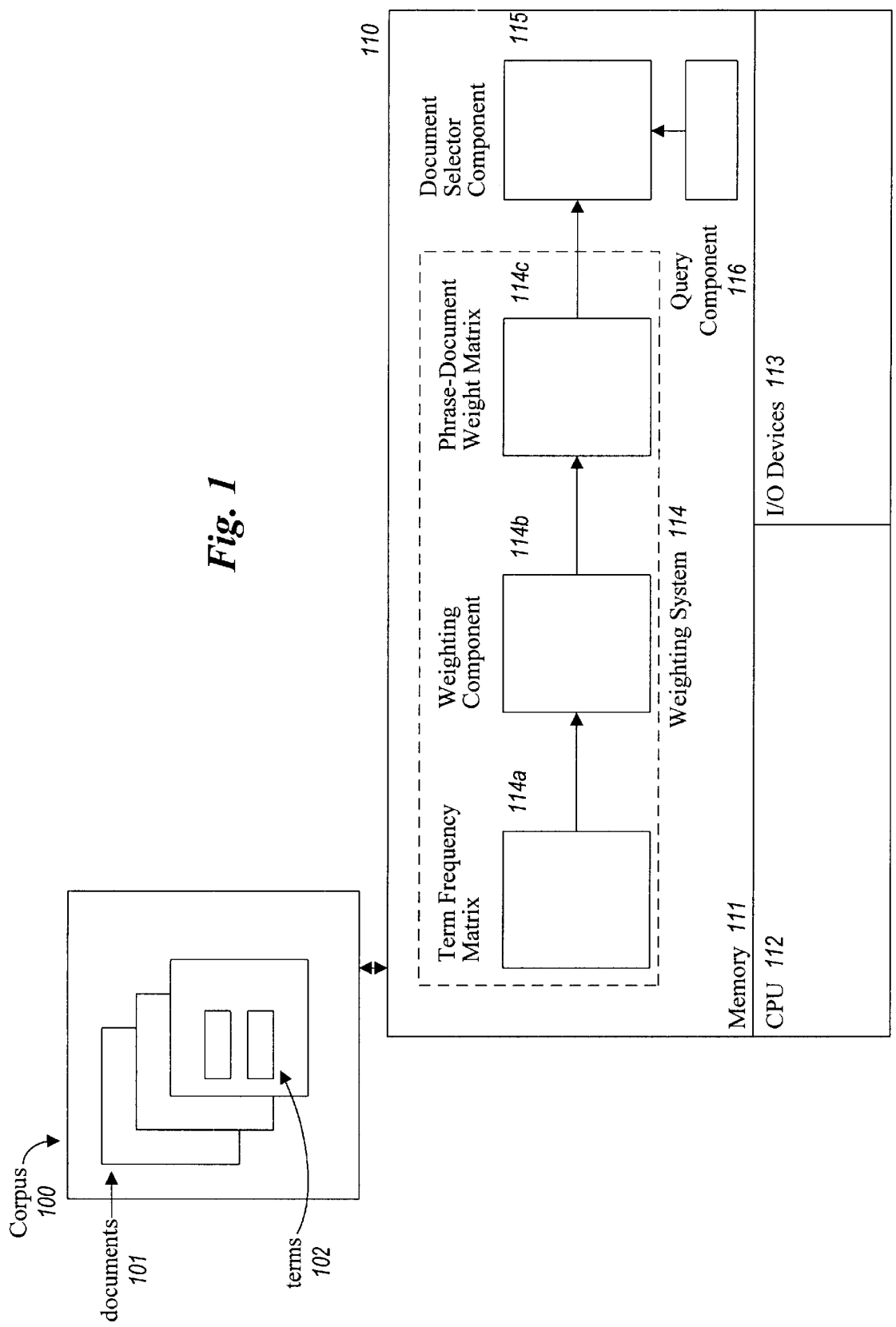
FIG. 1 is a block diagram of a computer system for executing the weighting system.

An embodiment of the present invention provides a weighting system for calculating the phrase-document importance for a phrase within a document that is part of a collection of documents (i.e., a corpus). The weighting system calculates the importance of a phrase within a document based on the term frequencies of the component terms that comprise the phrase. In this way, the weighting system avoids having to count and store the actual number of occurrences of phrases in the documents (i.e., phrase frequencies) or having to count the number of documents that contain the phrase (i.e., document frequency of the phrase). To calculate the importance of a phrase within a document, the weighting system estimates the total number of occurrences of the phrase (i.e., total phrase frequency) throughout the corpus and estimates the number of documents in which the phrase occurs (i.e., document frequency of the phrase) based on the term frequencies of the component terms and the total of all term frequencies in the corpus. The weighting system then combines the estimated total phrase frequency, estimated document frequency for the phrase, and the phrase frequency within the document to generate the weight of the phrase for the document.

To estimate the total phrase frequency and the document frequency of a phrase, the weighting system estimates a phrase probability that a randomly selected phrase in a document that contains each component term is that phrase. based on the term frequencies of the component terms of the phrase. In one embodiment, the weighting system derives the phrase probability from the term probabilities of the component terms. The term probability of a component term is the probability that any randomly selected term in a document that contains that component term is that component term. The weighting system estimates the term probability as the ratio of the average term frequency for the documents that contain that component term to the average number of terms per document in the corpus. The weighting system then multiplies the estimated term probabilities of the component terms to estimate the phrase probability of the phrase.

The weighting system estimates the document frequency of the phrase by multiplying the estimated phrase probability by an estimated number of documents that contain each of the component terms. The weighting system estimates the number of documents that contain each component term by multiplying the document probability for the phrase by the number of documents in the corpus. The document probability for the phrase is the probability that a randomly selected document will contain each component term of the phrase. The weighting system estimates the document probability for a phrase by multiplying together the document probabilities of each component term of the phrase. The document probability of a component term is the probability that a randomly selected document will contain the component term. The weighting system calculates the document probability of a component term by dividing the document frequency of the component term by the number of documents in the corpus.

The weighting system estimates the total phrase frequency by multiplying an estimated average phrase frequency by the estimated document frequency for the phrase. The average phrase frequency for the phrase is the sum of the phrase frequencies for the phrase divided by the document frequency of the phrase. The weighting system estimates the average phrase frequency by multiplying the estimated phrase probability by the average number of terms per document.

The weighting system then counts the number of occurrences of the phrase within the document (i.e., phrase frequency). The weighting system then uses the estimated document frequency for the phrase, the estimated total phrase frequency, and the phrase frequency for the document to calculate the importance of the document to the phrase.

The weighting system calculates the importance based on a computed normalized phrase frequency and a computed inverse document frequency of the phrase. The computed normalized phrase frequency is a function, referred to as the "computed normalized term frequency function" ("A"), of a normalized phrase frequency. The normalized phrase frequency is the phrase frequency, which is the number of times that the phrase occurs in the document, normalized by the estimated total phrase frequency of the phrase within all documents, which is the estimated total number of times that the phrase occurs in all the documents. The weighting system normalizes the phrase frequency by dividing the phrase frequency by a function, referred to as the "normalizing term frequency function" ("Γ"), of the estimated total phrase frequency. The computed inverse document frequency of the phrase is a function, referred to as the "computed inverse document frequency function" ("B"), of the estimated inverse document frequency of the phrase. Thus, the importance of a phrase within a document is represented by the following equation:

$$W_{tj} = A\left(\frac{PF_{tj}}{\Gamma(PF_t)}\right) * B\left(\frac{N}{n_t}\right)$$

where $W_{tj}$ represents the importance of phrase t within document j, where $PF_{tj}$ represents the phrase frequency for phrase t within document j, where $PF_t$ represents the total phrase frequency for phrase t, where $n_t$ represents the number of documents that contain phrase t, and N represents the number of documents. The selection of the various functions that are used by the weighting system are made to improve the accuracy of the importance calculation and are described in U.S. application Ser. No. 09/216,085, entitled "A Method and System for Calculating Term-Document Importance," which is being filed concurrently and is hereby incorporated by reference.

FIG. 1 is a block diagram of a computer system for executing the weighting system. The computer system 110 includes a memory 111, central processing unit 112, and various I/O devices 113. The input/output devices may include a monitor, keyboard, and storage devices. The storage devices may include a disk, a CD-ROM, or other computer-readable media. The computer system 110 can access the corpus 100 of documents that may be contained on a storage device directly connected to the computer or on storage devices of other computer systems. The corpus contains documents 101 and each document comprises one or more terms 102. The weighting system 114 comprises a term frequency matrix 114*a*, a weighting component 114*b*, and a phrase-document weight matrix 114*c*. The term frequency matrix maps each term to the number of times that it occurs in each document. Thus, the number of rows in the term frequency matrix is equal to the number of unique terms ("M") in the corpus, and the number of columns in the matrix is equal to the number of documents ("N") in the corpus. The term frequency matrix can be pre-generated or generated by the weighting system by searching through the corpus. The weighting component determines the phrase-document importance (weight) of phrases within documents. The weighting component inputs the term frequency matrix and generates the phrase-document weight matrix. The phrase-document weight matrix has a row for each unique phrase and a column for each document in the corpus. The phrase-document weight matrix contains the phrase-document weight for phrases within documents. One skilled in the art will appreciate that the matrices can be stored using various compaction techniques. For example, the phrase-document weight matrix could store only those weights above a certain threshold level. The document selector component 115 inputs a search phrase from the query component 116 and identifies those documents whose phrase-document weight for that search phrase is highest as indicated by the phrase-document weight matrix.

Figure 2:
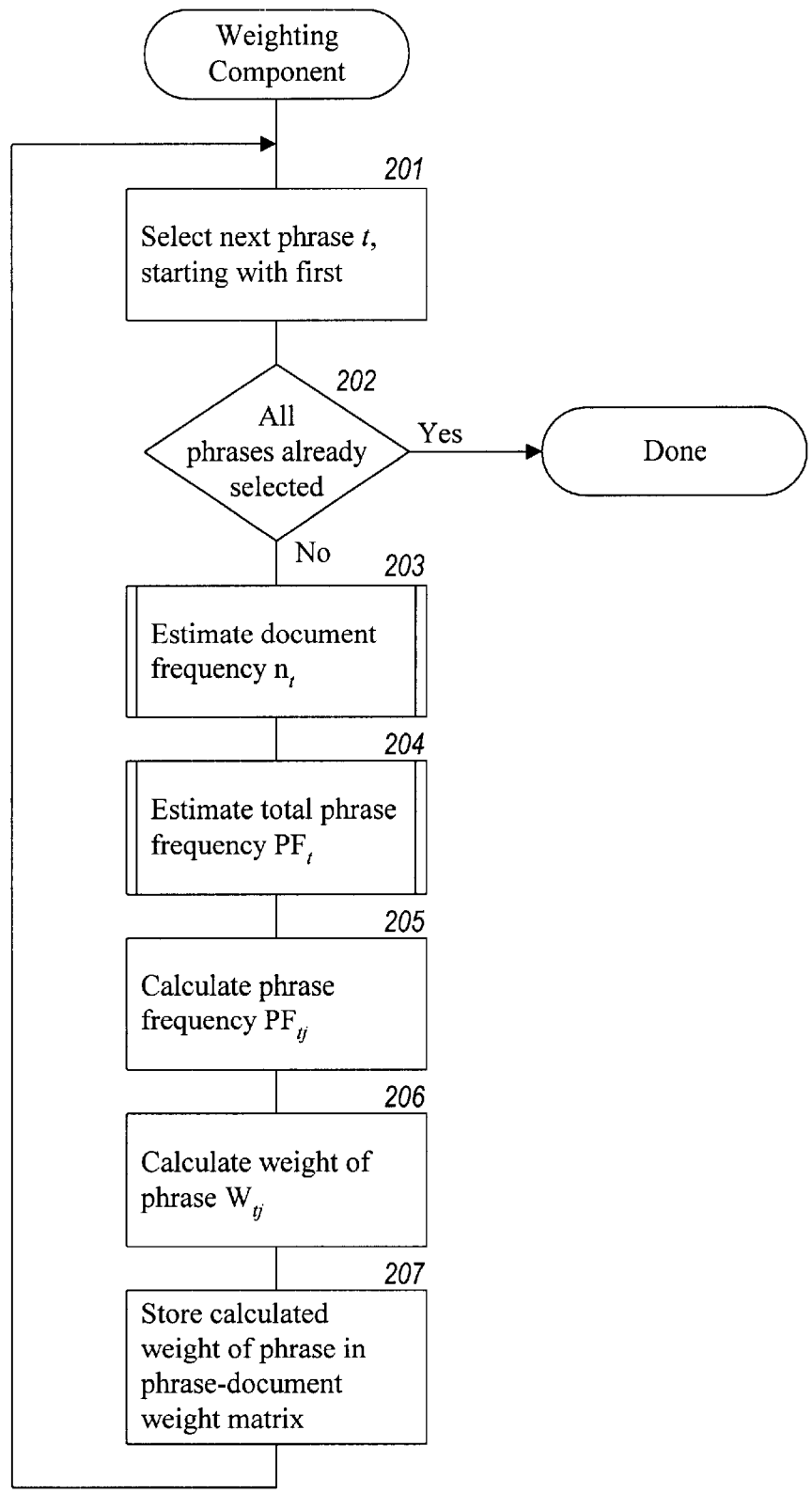
FIG. 2 is a flow diagram of the weighting component.

FIG. 2 is a flow diagram of the weighting component. The weighting component selects various phrases and calculates the weight for each of the phrases within a document. The phrases to be weighted may be input to the weighting component or may be automatically generated by scanning the document. The steps of the weighting component may be repeated for each document in the corpus. In step 201, the component selects the next phrase starting with the first. In step 202, if all the phrases have already been selected, then the component is done, else the component continues at step 203. In step 203, the component estimates the document frequency $n_t$ for the selected phrase t. In step 204, the component estimates the total phrase frequency $PF_t$. In step 205, the component calculates the phrase frequency $PF_{tj}$ for the document j. In step 206, the component calculates the weight of the phrase $W_{tj}$ in accordance with equation (2.1) described below. In step 207, the component stores the weight of the selected phrase in the phrase-document weight matrix and loops to step 201 to select the next phrase.

Figure 3:
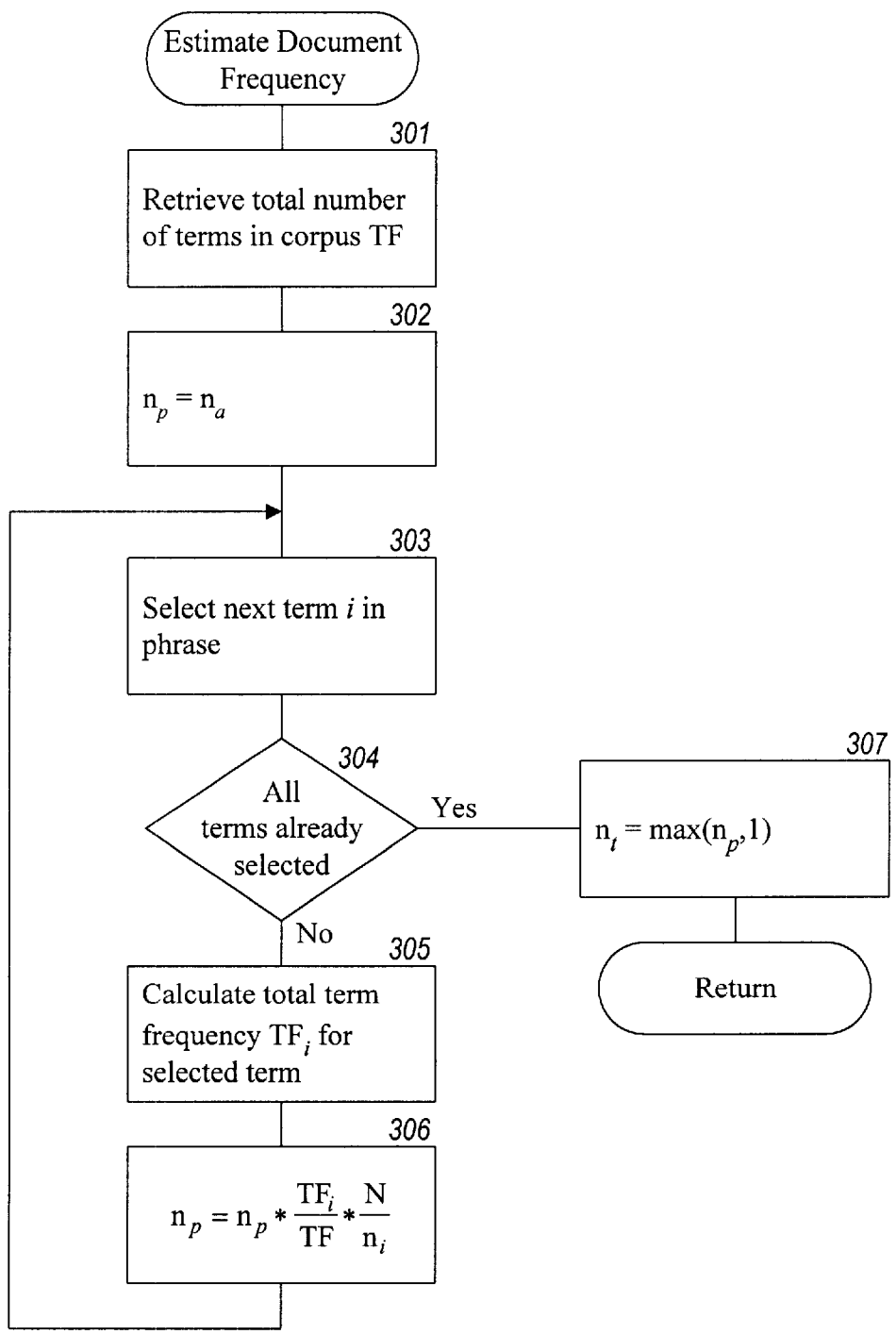
FIG. 3 is a flow diagram of a routine to estimate the number of documents that contain a phrase.

FIG. 3 is a flow diagram of a routine to estimate the number of documents that contain the phrase. This routine estimates the number of documents that contain the phrase (i.e., document frequency) by multiplying together the term probabilities of each component term and multiplying that product (i.e., the phrase probability) times the number of documents in the corpus that contain each of the component terms of the phrase. In step 301, the routine retrieves the total number of terms in the corpus TF. The routine may calculate this total by totaling all the term frequencies in the term-frequency matrix. In step 302, the routine initializes the number of documents that contain the phrase np to an estimated total number of documents in the corpus na that contain each component term of the phrase. The routine estimates this total number by multiplying together the document probability of each component term to estimate the probability a document contains each component term. The routine then multiplies this estimated document probability by the number of documents in the corpus to estimate the number of documents that contain each component term. In steps 303–306, the routine loops multiplying the number of documents that contain the phrase $n_p$ by the term probability of each component term. In step 303, the routine selects the next component term i of the phrase. In step 304, if all the component terms have already been selected, then the routine continues at step 307, else the routine continues at step 305. In step 305, the routine calculates the total term frequency $TF_i$ for the selected component term. The routine may calculate the total term frequency by totaling the term frequencies of the term frequency matrix for the row corresponding to the selected component term. In step 306, the routine multiplies the document frequency for the phrase $n_p$ by the term probability, which is the average term frequency for the selected component term ($TF_i/n_i$) divided by the average number of terms in a document (TF/N). The routine then loops to step 303 to select the next component term. In step 307, the routine sets the estimated document frequency $n_t$ for the phrase to the calculated document frequency $n_p$ or one, whichever is larger. The routine then returns.

Figure 4:
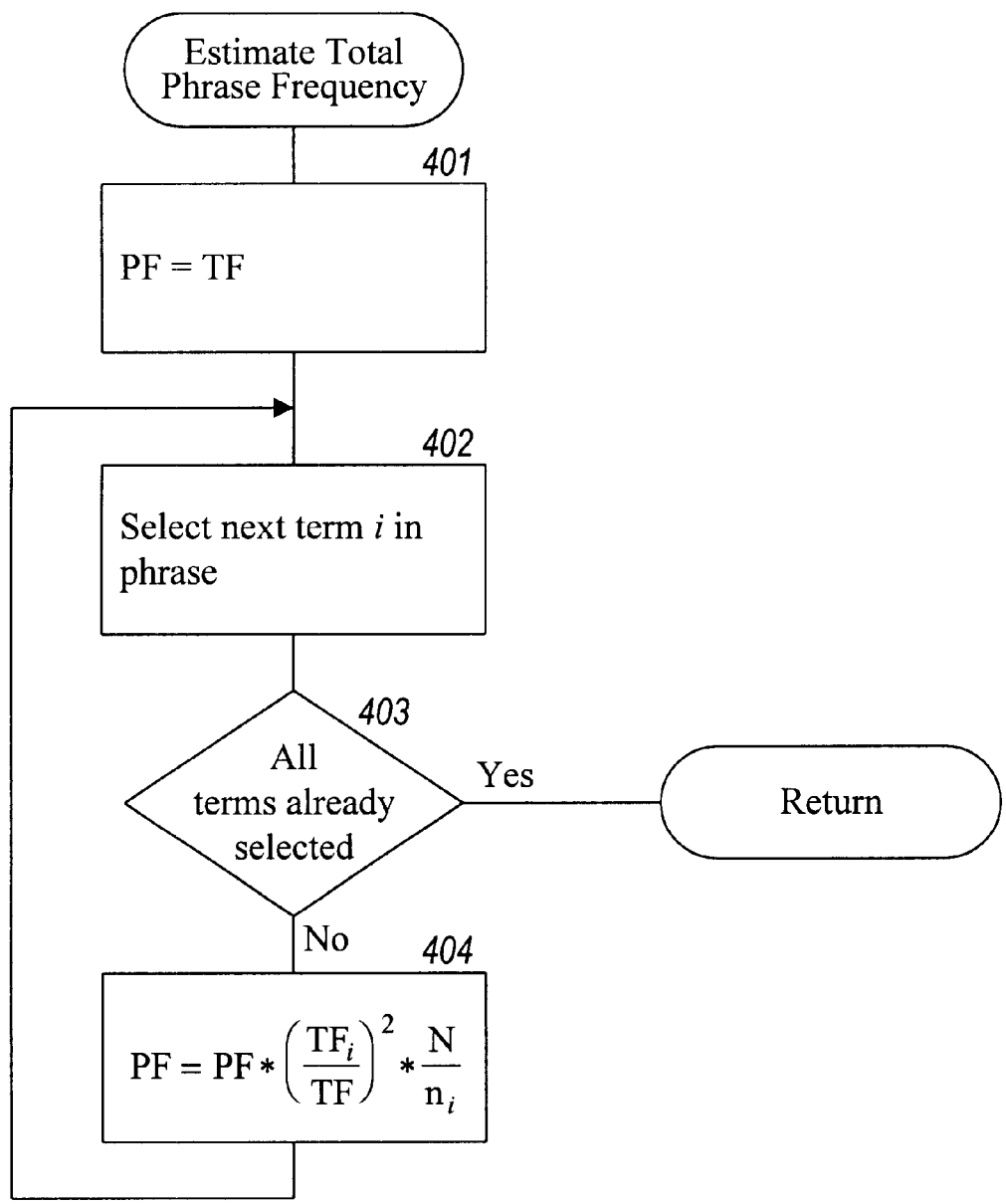
FIG. 4 is a flow diagram of a routine to estimate the total phrase frequency.

FIG. 4 is a flow diagram of a routine to estimate the total phrase frequency. This routine estimates the total phrase frequency PF by multiplying an estimated average phrase frequency of documents that contain the phrase by the estimated document frequency for the phrase. In step 401, the routine initializes the total phrase frequency PF equal to the total term frequency TF. The routine may calculate the total term frequency by totaling all the term frequencies in the term frequency matrix. In steps 402–404, the routine loops selecting each component term. In step 402, the routine selects the next component term i starting with the first. In step 403, if all the component terms have already been selected, then the routine returns, else the routine continues at step 404. In step 404, the routine multiplies the total phrase frequency PF by the square of the ratio of the total term frequency $TF_i$ for the selected component term to the total term frequency TF multiplied by the inverse document frequency for the selected component term ($N/n_i$). This calculation is described below in detail. The routine then loops to step 402 to select the next component term.

Weighting Formula

The weighting system calculates the weight of a document for a phrase based on the phrase frequency and the inverted document frequency for the phrase. The calculation of the weight W is represented by the following equation:

$$W_{tj} = CNPF_{tj} * CIDF_t \quad (2.1)$$

where $W_{tj}$ is the weight for phrase t and document j, where $CNPF_{tj}$ is the computed normalized phrase frequency as described below for phrase t and document j, and $CIDF_t$ is the computed inverse document frequency as described below for phrase t.

The computed inverse document frequency is derived by applying the computed inverse document frequency function B to the inverse document frequency for the phrase. In one embodiment, the computed inverse document frequency function B is a logarithmic function given by the following equation:

$$CIDF_t = \log_\beta \frac{N}{n_t} \quad (2.2)$$

where N is the number of documents in the corpus, where $n_t$ is the number of documents that contain the phrase t, and where $\beta$ is the base of the logarithm.

The computed phrase frequency is derived by applying the computed normalized term frequency function A to the results of applying the normalizing term frequency function $\Gamma$ to the total phrase frequency. In one embodiment, the computed term frequency function A is the logarithmic function given by the following equation:

$$CNPF_{tj} = A\left(\frac{PF_{tj}}{\Gamma(PF_t)}\right) = \log_\alpha\left((\alpha - 1) + \frac{PF_{tj}}{\Gamma(PF_t)}\right) \quad (2.3)$$

where $\alpha$ is the base of the logarithm. The normalized phrase frequency $NPF_{tj}$ for the phrase t within document j is given by the following equation:

$$NPF_{tj} = \frac{PF_{tj}}{\Gamma(PF_t)} \quad (2.4)$$

As discussed above, the normalizing term frequency function $\Gamma$ is either based on the square root of the total phrase frequencies or a logarithm of the total phrase frequencies. A square root based normalizing term frequency function $\Gamma$ is given by the following equation:

$$\Gamma(PF_t) = \left(1 + \sum_{k=1}^{n_t} PF_{tk}\right)^{1/2} \quad (2.5)$$

One skilled in the art would appreciate that roots (i.e., powers between 0 and 1) other than the square root can be used (e.g., cube root). A logarithmic-based normalizing term frequency function is given by the following equation:

$$\Gamma(PF_t) = \log_\gamma\left((\gamma - 1) + \sum_{k=1}^{n_t} PF_{tk}\right) \quad (2.6)$$

where $\gamma$ is the base of the logarithm. The weighting system preferably uses a square root or logarithmic based normalizing term frequency function. Since the square root of a number is in general larger than the logarithm of a number (at least as the number approaches infinity), a square root function tends to lower the contribution of the phrase frequency to the weight as compared to a logarithmic function. U.S. application Ser. No. 09/216,085, entitled "Method and System for Term-Document Importance," describes techniques for calculating the bases $\alpha$, $\beta$, and $\gamma$ of the logarithms.

Estimation of Document Frequency for a Phrase

The weighting system estimates the number of documents $n_a$ that contain each component term of a phrase by multiplying together the document probability of the phrase p(t) by the number of documents in the corpus N. The document probability of the phrase is the probability that a document contains each component term of a phrase is given by the following equation:

$$p(t) = \prod_{i=1}^{T_t} \frac{n_i}{N} \quad (3.1)$$

where p(t) is the document probability for phrase t and where $T_t$ is equal to the number of terms in phrase t. Thus, the document probability of the phrase is the product of the document probabilities ($n_i/N$) of the component terms. Thus, the number of documents $n_a$ that contain each term of the phrase is estimated by the following equation:

$$n_a = N * p(t) \quad (3.2)$$

The number of documents that contain the phrase is, of course, less than or equal to the number of documents $n_a$ that contain each component term. That is, the number of documents that contains all the component terms includes those documents that contain component terms that may be scattered throughout the document and not necessarily in sequence. The weighting system estimates the document frequency for the phrase based on the estimated phrase probability of the phrase. The estimated phrase probability is the probability that any randomly selected phrase in the documents that contain each component term is that phrase. The estimated phrase probability is derived from the term probabilities of the component terms. The term probability of a component term i is given by the estimated average term frequency for the term i within those documents $n_a$ that contain each component term divided by the estimated average total term frequency of all terms within those documents $n_a$ that contain each component term. This term probability $p_D(i)$ for component term i is given by the following equation:

$$p_D(i) = \frac{\left(\left(\sum_{k=1}^{n_i} TF_{ik}\right)/n_i\right)*n_a}{\left(\left(\sum_{l=1}^{M}\sum_{k=1}^{n_l} TF_{lk}\right)/N\right)*n_a} \quad (4.1)$$

Equation (4.1) reduces the following equation:

$$p_D(i) = \frac{N*\sum_{k=1}^{n_i} TF_{ik}}{n_i * \sum_{l=1}^{M}\sum_{k=1}^{n_l} TF_{lk}} \quad (4.2)$$

Conceptually, the term probability of component term i is the average term frequency of term i in those document $n_i$ that contain term i divided by the average number of terms per document in the corpus N. The phrase probability $p_D(t)$, which is the product of the term probabilities of the component term i, is given by the following equation:

$$p_D(t) = \prod_{i=1}^{T_t} p_D(i) \quad (4.3)$$

therefore, the phrase probability of a phrase indicates the probability that a randomly selected phrase from the documents $n_a$ that contain all the component terms is that phrase. The number of documents $n_p$ that contain the phrase is given by the following equation:

$$n_p = n_a * p_D(t) \quad (5.1)$$

Substituting equation (3.1), (3.2), (4.2), and (4.3) results in following equation:

$$n_p = N * \prod_{i=1}^{T_t} \frac{n_i}{N} * \prod_{i=1}^{T_t} \frac{N * \sum_{k=1}^{n_i} TF_{ik}}{n_i * \sum_{l=1}^{M}\sum_{k=1}^{n_l} TF_{lk}} \quad (5.2)$$

By combining the products and canceling the various terms, the result is given by the following equation:

$$n_p = N * \prod_{i=1}^{T_t} \frac{\sum_{k=1}^{n_i} TF_{ik}}{\sum_{l=1}^{M}\sum_{k=1}^{n_l} TF_{lk}} \quad (5.3)$$

To ensure that the number of documents that contain the phrase is at least one, the final number of documents that contain the phrase $n_t$ is set to the greater of the estimated number of documents that contain the phrase $n_p$ and 1, which is given by the following equation:

$$n_t = \max(n_p, 1) \quad (5.4)$$

Estimation of Total Phrase Frequency

The weighting system estimates the total phrase frequency PF based on the average phrase frequency for the phrase t. The average phrase frequency $aPF_t$ for a phrase is the phrase probability times the average number of terms in a document. The average phrase frequency for term t is given in the following equation:

$$aPF_t = K * p_D(t) \quad (6.1)$$

where K is the average number of terms in a document. The average number of terms in a document is the total term frequency TF divided by the number of documents in the corpus N. Substitution of the formula for the average number of terms per document and the phrase probability of equations (4.2) and (4.3) into equation (6.1) results in the following equation:

$$aPF_t = \frac{\sum_{l=1}^{M}\sum_{k=1}^{n_l} TF_{lk}}{N} * \prod_{i=1}^{T_t} \frac{N * \sum_{k=1}^{n_i} TF_{ik}}{n_i * \sum_{l=1}^{M}\sum_{k=1}^{n_l} TF_{lk}} \quad (6.2)$$

The weighting system estimates the total phrase frequency $PF_t$ or $\Sigma aPF_t$ as the product of the average phrase frequency $aPF_t$ times the document frequency $n_i$, which is given by the following equation:

$$\Sigma aPF_t = n_t * aPF_t \quad (7.1)$$

When equation (5.3), (5.4), and (6.2) are substituted into equation (7.1), the result is given by the following equation:

$$\Sigma aPF_t = \frac{\sum_{l=1}^{M}\sum_{k=1}^{n_l} TF_{lk}}{N} * \prod_{i=1}^{T_t} \frac{N * \sum_{k=1}^{n_i} TF_{ik}}{n_i * \sum_{l=1}^{M}\sum_{k=1}^{n_l} TF_{lk}} * N * \prod_{i=1}^{T_t} \frac{\sum_{k=1}^{n_i} TF_{ik}}{\sum_{l=1}^{M}\sum_{k=1}^{n_l} TF_{lk}} \quad (7.2)$$

This equation reduces to the following equation:

$$\Sigma aPF_t = \sum_{l=1}^{M} \sum_{k=1}^{n_l} TF_{lk} * \prod_{i=1}^{T_t} \frac{\left(\sum_{k=1}^{n_i} TF_{ik}\right)^2 * N}{\left(\sum_{l=1}^{M} \sum_{k=1}^{n_l} TF_{lk}\right)^2 * n_i}. \quad (7.3)$$

Thus, the weighting system estimates the total phrase frequency for a phrase to be the total term frequency of all terms times the product for each component term of the square of the total term frequency for that term divided by the square of the total term frequency for all terms times the inverse document frequency for that component term.

In one embodiment, the weighting system stores with each document those phrases of the document with the highest weights along with their weights. These phrases are referred to as "smart phrases." The storing of these smart phrases is analogous to the storing of smart words as described in the U.S. patent application Ser. No. 09/216,085, entitled "Method and System for Calculating Term-Importance." In particular, the weighting system may store the smart phrases and their weights in string-valued properties of a document, referred to as "SmartKeyPhrases" and "SmartKeyPhraseWeighting." The weighting system may use various algorithms for determining which phrases are candidate phrases to be a smart phrase. In one such algorithm, a candidate phrase is a phrase whose words are all capitalized except for connector words such as "of," "a," "the," "by," and "for." Example candidate phrases would be "Bill Clinton," "President of the United States of America," and "State of the Union." A candidate phrase may also include terms (e.g., words, letters, numbers, combinations of letters and numbers) separated only by connector white spaces such as ".", "-", ":", "\" and "/". Example candidate phrases would be "data-base," "I.B.M.," and "http://www.microsoft.com."

The highest weighted candidate phrases for a document are selected as the smart phrases. The weighting system may use the algorithm described above to weight the candidate phrases. Alternatively, the weighting system may select the number of occurrences of the phrase within the document, that is phrase frequency as the weight. The weighting system may also multiply the phrase frequency by the sum of the weights of the component terms to derive the weight of the phrase.

Although the present invention has been described in terms of various embodiments, it is not intended that the invention be limited to these embodiments. Modifications within the spirit of the invention will be apparent to those skilled in the art. For example, one skilled in the art will appreciate that the various estimated values could be estimated using different estimation techniques. Also, actual values can be substituted for various of the estimated values. The scope of the present invention is defined by the claims that follow.

We claim:

1. A method in a computer system for generating a weight for a phrase within one of a plurality of documents, each document having terms, the phrase having component terms, the method comprising:

for each term, providing a term frequency that represents the number of occurrences of that term in the plurality of documents;

estimating a document frequency for the phrase based on an estimated phrase probability of the phrase, the document frequency being the number of the plurality of the documents that contain the phrase, the estimated phrase probability being an estimation of the probability that any phrase in documents that contain each component term is the phrase, the phrase probability being derived from term probabilities of the component terms, the term probability of a component term being a ratio of an average of the provided term frequencies for the component terms per document that contains that component term to an average number of terms per document;

estimating a total phrase frequency for the phrase based on an average phrase frequency for the phrase times the estimated document frequency for the phrase, the average phrase frequency being derived from the phrase probability of the phrase and the average number of terms per document; and combining the estimated document frequency with the estimated total phrase frequency to generate the weight of the phrase.

2. The method of claim 1 wherein the combining includes dividing the number of the plurality of the documents by the estimated document frequency.

3. The method of claim 1 wherein the combining includes dividing the number of occurrences of the phrase within the one document by the estimated total phrase frequency.

4. The method of claim 3 wherein the number of occurrences of the phrase within the one document is estimated based on the average phrase frequency.

5. The method of claim 3 wherein the number of occurrences of the phrase within the one document is generated by counting the number of occurrences within the one document.

6. The method of claim 1 including deriving the average phrase frequency by multiplying the estimated phrase probability by the average number of terms per document.

7. The method of claim 1 wherein the combining is in accordance with the following formula:

$$W_{tj} = \log \alpha \left( (\alpha - 1) + \frac{PF_{tj}}{\Gamma(PF_t)} \right) * \log_\beta \frac{N}{n_t}$$

where $W_{tj}$ is the weight of the phrase, where $PF_{tj}$ is the phrase frequency within the one document, where $PF_t$ is the estimated total phrase frequency, where $\Gamma$ is a normalizing term frequency function, where N is the number of documents, where $n_t$ is the estimated document frequency, and where bases $\alpha$ and $\beta$ are bases of the logarithms.

8. The method of claim 7 wherein the normalizing term frequency function $\Gamma$ is a square root function.

9. The method of claim 7 wherein the normalizing term frequency function $\Gamma$ is a logarithmic function.

10. The method of claim 7 wherein the bases $\alpha$ and $\beta$ are selected so that each factor of the formula contributes equally on average to the weight.

11. The method of claim 1 wherein the combining is a logarithmic function of a phrase frequency for the document normalized by the estimated total phrase frequency divided by a logarithm of the number of the plurality of documents divided by the estimated document frequency for the phrase.

12. The method of claim 1 including estimating the number of documents that contain each component term by multiplying the number of the plurality of documents by the document probability of the phrase, the document probability of the phrase being a probability that a document contains each component term.

13. The method of claim 12 wherein the document probability of a phrase is a product of the document probabilities of each component term, the document probability of a component term being a probability that a document contains that component term.

14. The method of claim 13 wherein the document probability of a component term is the document frequency of that term divided by the number of the plurality of documents, the document frequency of a term being the number of the plurality of the documents that contain that term.

15. A method in a computer system for estimating a document frequency of a phrase, the document frequency indicating a number of documents of a plurality of documents that contains the phrase, each document having terms, each term having a term frequency for each document, the term frequency for a term indicating a number of occurrences of that term within the document, the phrase having component terms, the method comprising:
   estimating a phrase probability for the phrase, the estimated phrase probability being an estimation of the probability that any phrase in documents that contain each component term of the phrase is the phrase, the estimated phrase probability being derived from the term frequencies of the component terms; and
   multiplying the estimated phrase probability by a number of documents that contain each component term to estimate the document frequency.

16. The method of claim 15 wherein the estimated phrase probability is the product of term probabilities for each component term, the term probability of a component term being the average term frequency for that component term per document that contains that term divided by the average number of terms per document.

17. The method of claim 16 wherein the average number of terms per document is calculated by dividing a total of the term frequencies by the number of the plurality of documents.

18. The method of claim 15 wherein the number of documents that contain each component term is estimated by multiplying the number of the plurality of documents by an estimated document probability of the phrase, the estimated document probability of the phrase being a probability that a document contains each component term of the phrase.

19. The method of claim 18 wherein the estimated document probability of the phrase is a product of document probabilities for each component term.

20. The method of claim 19 wherein the document probability of each component term is the document frequency of the component term divided by the number of the plurality of documents.

21. A method in a computer system for estimating a total phrase frequency of a phrase, the total phrase frequency indicating a total number of occurrences of the phrase within a plurality of documents, each document having terms, each term having a term frequency for each document, the term frequency for a term indicating a number of occurrences of that term within the document, the phrase having component terms, the method comprising:
   estimating a phrase probability for the phrase, the estimated phrase probability being an estimation of the probability that any phrase in documents that contain each component term of the phrase is the phrase, the estimated phrase probability being derived from the term frequencies of the component terms;
   estimating an average phrase frequency for the phrase by multiplying the estimated phrase probability by an average number of terms per document; and
   multiplying the estimated average phrase frequency by an estimated number of documents that contain the phrase to estimate the total phrase frequency.

22. The method of claim 21 wherein the estimated phrase probability is the product of term probabilities for each component term, the term probability of a component term being the average term frequency for that component term per document that contains that term divided by the average number of terms per document.

23. The method of claim 22 wherein the average number of terms per document is calculated by dividing a total of the term frequencies by the number of the plurality of documents.

24. The method of claim 21 wherein the estimated number of documents that contain the phrase is derived by multiplying the estimated phrase probability by a number of documents that contain each component term to estimate the document frequency.

25. The method of claim 24 wherein the number of documents that contain each component term is estimated by multiplying the number of the plurality of documents by an estimated document probability of the phrase, the estimated document probability of the phrase being a probability that a document contains each component term of the phrase.

26. The method of claim 25 wherein the estimated document probability of the phrase is a product of document probabilities for each component term.

27. The method of claim 26 wherein the document probability of each component term is the document frequency of the component term divided by the number of the plurality of documents.

28. The method of claim 21 wherein the average number of terms per document is derived by totaling all the term frequencies and dividing that total by the number of the plurality of documents.

29. A method in a computer system for generating a weight for a phrase within one of a plurality of documents, each document having terms, the phrase having component terms, the method comprising:
   estimating a number of the plurality of documents that contain the phrase based on term frequencies of the component terms, a term frequency of a term being a number of occurrences of that term in document;
   estimating a total number of times the phrase occurs in the plurality of documents based on the term frequencies of the component terms; and
   combining the estimated number of documents that contain the phrase and the estimated total number of times that the phrase occurs in the plurality of documents to generate the weight for the phrase.

30. The method of claim 29 wherein the combining also includes combining a number of occurrences of the phrase within the one document.

31. The method of claim 29 wherein the combining also includes combining the number of the plurality of documents.

32. A method in a computer system for estimating a number of a plurality of documents that contain a phrase, each document having terms, the phrase having component terms, the method comprising:
   providing an indication of a number of occurrences of each component term within each document;
   providing an indication of a total number of occurrences of all terms within the plurality of documents;
   calculating a probability that a document contains the phrase based on the number of occurrences of each component term within each document and the total number of occurrences of all terms within the plurality of document; and multiply the calculated probability by the total number of the plurality of document to estimate that number of documents that contain the phrase.

33. The method of claim 32 wherein the calculating of the probability that a document contains the phrase as the product of the ratios for each component term of the number of documents that contain that component term and the number of the plurality of documents.

34. A method in a computer system for estimating a total number of occurrences of a phrase within a plurality of documents, each document having terms, the phrase having component terms, the method comprising:

providing an indication of a number of occurrences of each component term within each document;

providing an indication of a total number of occurrences of all terms within the plurality of documents;

estimating an average number of occurrences of the phrase in documents that contain the phrase based on the number of occurrences of each component term within each document and the total number of occurrences of all terms with the plurality of document; and multiplying the estimated average number of occurrences of the phrase by the number of the plurality of documents that contain the phrase to estimate the total number of occurrences of the phrase within the plurality of documents.

35. The method of claim 34 wherein the estimating of an average number of occurrences of the phrase includes calculating a probability that any phrase within the plurality of documents is the phrase and multiplying the calculated probability by an average number of occurrences of terms within a document.

36. A computer system for calculating a document frequency of a phrase, each document having terms, each term having a term frequency for each document, the phrase having component terms, comprising:

a component that calculates a phrase probability for the phrase, the calculated phrase probability being an estimation of the probability that any phrase in documents that contain each component term of the phrase is the phrase, the calculated phrase probability being derived from the term frequencies of the component terms; and a component that combines the calculated phrase probability with a number of documents that contain each component term to calculate the document frequency.

37. The system of claim 36 wherein the calculated phrase probability is the product of term probabilities for each component term, the term probability of a component term being the average term frequency for that component term per document that contains that term divided by the average number of terms per document.

38. The system of claim 37 wherein the average number of terms per document is calculated by dividing a total of the term frequencies by the number of the plurality of documents.

39. The system of claim 36 wherein the number of documents that contain each component term is calculated by multiplying the number of the plurality of documents by the document probability of the phrase, the document probability of the phrase being a probability that a document contains each component term of the phrase.

40. The system of claim 39 wherein the document probability of the phrase is a product of document probabilities for each component term.

41. The system of claim 40 wherein the document probability of each component term is the document frequency of the component term divided by the number of the plurality of documents.

42. A computer system for calculating a total phrase frequency of a phrase, each document having terms, each term having a term frequency for each document, the phrase having component terms, comprising:

a component for calculating a phrase probability for the phrase, the calculated phrase probability being derived from the term frequencies of the component terms;

a component for calculating an average phrase frequency for the phrase by multiplying the calculated phrase probability by an average number of terms per document; and a component for multiplying the calculated average phrase frequency by a calculated number of documents that contain the phrase to calculate the total phrase frequency.

43. The system of claim 42 wherein the calculated phrase probability is the product of term probabilities for each component term, the term probability of a component term being the average term frequency for that component term per document that contains that term divided by the average number of terms per document.

44. The system of claim 43 wherein the average number of terms per document is calculated by dividing a total of the term frequencies by the number of the plurality of documents.

45. The system of claim 42 wherein the calculated number of documents that contain the phrase is derived by multiplying the calculated phrase probability by a number of documents that contain each component term to calculate the document frequency.

46. The system of claim 45 wherein the number of documents that contain each component term is calculated by multiplying the number of the plurality of documents by a calculated document probability of the phrase, the calculated document probability of the phrase being a probability that a document contains each component term of the phrase.

47. The system of claim 46 wherein the calculated document probability of the phrase is a product of document probabilities for each component term.

48. The system of claim 47 wherein the document probability of each component term is the document frequency of the component term divided by the number of the plurality of documents.

49. The system of claim 42 wherein the average number of terms per document is derived by totaling all the term frequencies and dividing that total by the number of the plurality of documents.

50. A computer-readable medium containing instructions for causing a computer system to generate a weight for a phrase within one of a plurality of documents, each document having terms, the phrase having component terms, by:

generating a term frequency that represents the number of occurrences of that term in the plurality of documents;

estimating a document frequency for the phrase based on an estimated phrase probability of the phrase, the phrase probability being derived from term probabilities of the component terms, the term probability of a component term being a ratio of an average of the generated term frequencies for the component terms per document that contains that component term to an average number of terms per document;

estimating a total phrase frequency for the phrase based on an average phrase frequency for the phrase times the estimated document frequency for the phrase, the average phrase frequency being derived from the phrase probability of the phrase and the average number of terms per document; and combining the estimated document frequency with the estimated total phrase frequency to generate the weight of the phrase.

51. The computer-readable medium of claim 50 wherein the combining includes dividing the number of the plurality of the documents by the estimated document frequency.

52. The computer-readable medium of claim 50 wherein the combining includes dividing the number of occurrences of the phrase within the one document by the estimated total phrase frequency.

53. The computer-readable medium of claim 52 wherein the number of occurrences of the phrase within the one document is estimated based on the average phrase frequency.

54. The computer-readable medium of claim 52 wherein the number of occurrences of the phrase within the one document is generated by counting the number of occurrences within the one document.

55. The computer-readable medium of claim 50 including deriving the average phrase frequency by multiplying the estimated phrase probability by the average number of terms per document.

56. The computer-readable medium of claim 50 wherein the combining is a logarithmic function of a phrase frequency for the document normalized by the estimated total phrase frequency divided by a logarithm of the number of the plurality of documents divided by the estimated document frequency for the phrase.

57. The computer-readable medium of claim 50 including estimating the number of documents that contain each component term by multiplying the number of the plurality of documents by the document probability of the phrase, the document probability of the phrase being a probability that a document contains each component term.

58. The computer-readable medium of claim 57 wherein the document probability of a phrase is a product of the document probabilities of each component term, the document probability of a component term being a probability that a document contains that component term.

59. The computer-readable medium of claim 58 wherein the document probability of a component term is the document frequency of that term divided by the number of the plurality of documents, the document frequency of a term being the number of the plurality of the documents that contain that term.

60. A computer-readable medium containing instructions that cause a computer system to generate a weight for a phrase within one of a plurality of documents, each document having terms, the phrase having component terms, by:

estimating a number of the plurality of documents that contain the phrase based on term frequencies of the component terms;

estimating a total number of times the phrase occurs in the plurality of documents based on the term frequencies of the component terms; and combining the estimated number of documents that contain the phrase and the estimated total number of times that the phrase occurs in the plurality of documents to generate the weight for the phrase.

61. The computer-readable medium of claim 60 wherein the combining also includes combining a number of occurrences of the phrase within the one document.

62. The computer-readable medium of claim 60 wherein the combining also includes combining the number of the plurality of documents.

63. A computer-readable medium containing instructions that cause a computer system to estimate a number of a plurality of documents that contain a phrase, each document having terms, the phrase having component terms, by:

calculating a probability that a document contains the phrase based on a number of occurrences of each component term within each document and a total number of occurrences of all terms within the plurality of document; and multiply the calculated probability by the total number of the plurality of documents to estimate that number of documents that contain the phrase.

64. The computer-readable medium of claim 63 wherein the calculating of the probability that a document contains the phrase as the product of the ratios for each component term of the number of documents that contain that component term and the number of the plurality of documents.

65. A computer-readable medium containing instructions for causing a computer system to estimate a total number of occurrences of a phrase within a plurality of documents, each document having terms, the phrase having component terms, by:

estimating an average number of occurrences of the phrase in documents that contain the phrase based on a number of occurrences of each component term within each document and a total number of occurrences of all terms with the plurality of document; and multiplying the estimated average number of occurrences of the phrase by the number of the plurality of document that contain the phrase to estimate the total number of occurrences of the phrase within the plurality of documents.

66. The computer-readable medium of claim 65 wherein the estimating of an average number of occurrences of the phrase includes calculating a probability that any phrase within the plurality of documents is the phrase and multiplying the calculated probability by an average number of occurrences of terms within a document.

* * * * *

UNITED STATES PATENT AND TRADEMARK OFFICE
CERTIFICATE OF CORRECTION

PATENT NO.    : 6,549,897 B1
DATED         : April 15, 2003
INVENTOR(S)   : Katariya et al.

It is certified that error appears in the above-identified patent and that said Letters Patent is hereby corrected as shown below:

<u>Column 6,</u>
Line 61, please delete "np" and insert therefor -- $n_p$ --;
Line 62, please delete "na" and insert therefor -- $n_a$ --

Signed and Sealed this

Fifth Day of August, 2003

JAMES E. ROGAN
*Director of the United States Patent and Trademark Office*